(12) United States Patent
Numata et al.

(10) Patent No.: US 7,697,810 B2
(45) Date of Patent: Apr. 13, 2010

(54) THREE-DIMENSIONAL PHOTONIC CRYSTAL AND MANUFACTURING METHOD THEREOF

(75) Inventors: Aihiko Numata, Inagi (JP); Kazuya Nobayashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/329,761

(22) Filed: Dec. 8, 2008

(65) Prior Publication Data

US 2009/0148114 A1    Jun. 11, 2009

(30) Foreign Application Priority Data

Dec. 10, 2007    (JP)    ............... 2007-318617

(51) Int. Cl.
G02B 6/10    (2006.01)
G02B 6/12    (2006.01)

(52) U.S. Cl. .................. 385/131; 385/129; 385/14

(58) Field of Classification Search .............. None
See application file for complete search history.

(56) References Cited

U.S. PATENT DOCUMENTS 6,993,235 B2 *    1/2006    Takagi et al. ............... 385/129

2005/0196118 A1    9/2005    Ikemoto et al.
2006/0245716 A1    11/2006    Uchida

FOREIGN PATENT DOCUMENTS

EP    1624326    2/2006
EP    1793248    6/2007

* cited by examiner

Primary Examiner—Omar Rojas
(74) Attorney, Agent, or Firm—Canon U.S.A., Inc., IP Division

(57) ABSTRACT

A three-dimensional photonic crystal includes a structure that includes first, second, third, and fourth layers in this order. The structure of each layer includes a flat surface as one end surface, and first, second, and third structural portions. The first structural portion has a first width along the flat surface and a first height from the flat surface. The second structural portion has a second width larger than the first width and a second height larger than the first height. The third structural portion has a width and a height that continuously or stepwise change in the extending direction of the structure. The flat surface at the structural portion of one of two adjacent layers in the first layer to the fourth layer contacts a surface opposite to the flat surface at the second structural portion of the other of the two adjacent layers.

4 Claims, 16 Drawing Sheets

US 7,697,810 B2

THREE-DIMENSIONAL PHOTONIC CRYSTAL AND MANUFACTURING METHOD THEREOF

BACKGROUND OF THE INVENTION

1. Field of the Invention

The present invention relates to a three-dimensional photonic crystal having a three-dimensional periodic refractive-index structure, and a manufacturing method thereof.

2. Description of the Related Art

Yablonovitch, Physical Review Letters, Vol. 58, p. 2059, 1987 proposes a concept of controlling the electromagnetic wave's characteristic, such as a transmission and a reflection, through periodically arranged structures as large as or smaller than a wavelength. This structure is known as a photonic crystal, and implements an optical element having a reflectance of 100% without a loss of the light in a predetermined wavelength region.

The operation that makes the reflectance 100% in the predetermined wavelength region is referred to as a photonic band gap (operation), in comparison with the energy gap of the semiconductor.

Furthermore, A three-dimensional fine periodic structure provides a photonic band gap to the incident light from all directions. This is also referred to as a complete photonic band gap (operation).

With the complete photonic band gap, a variety of applications including a control of a spontaneous emission in a light-emitting element are available, and a new functional device that does not conventionally exist can be implemented. Therefore, a functional device configured to implement the complete photonic band gap in a wider wavelength region.

Conventionally, U.S. Pat. Nos. 5,335,240, 5,440,421, and 6,597,851 propose some structures each having a complete photonic band gap operation.

U.S. Pat. No. 5,335,240 discloses a woodpile structure that has a stack of a plurality of layers, each of which arranges a plurality of columnar structures in parallel having a constant sectional shape. In the plural layers, directions of columnar structures alternately differ by 90°.

U.S. Pat. No. 5,440,421 discloses a structure that arranges and partially overlaps a plurality of parallel columnar structures in a stacking direction, and has a plurality of holes that extend in the stacking direction.

U.S. Pat. No. 6,597,851 discloses a stacked structure that arranges a plurality of layers while shifting them by a length that is ⅓ as long as a fundamental period, each layer having a plurality of hexagonal columnar structures that extend in the stacking direction on a flat part that has a plurality of holes.

The woodpile structure proposed in U.S. Pat. No. 5,335,240 has an advantage of a simple structure and an easy manufacture because four layers constitute one period.

Since the photonic band gap of the woodpile is narrower than that of the inverse opal, it is difficult to realize a device (such as a waveguide and a wavelength selective filter) which can operate in a wide operational band. However, the inverse opal that can provide the device that can operate in the wide operational band is hard to manufacture by the conventional semiconductor process.

In addition, the structure proposed in U.S. Pat. No. 5,440, 421 also has the complete photonic band gap, but requires a plurality of very deep holes, and is hard to manufacture.

Moreover, the structure proposed in U.S. Pat. No. 6,597, 851 has smaller anisotropy and a comparatively wider photonic band gap width than the woodpile structure. However, it is difficult to manufacture because six layers constitute one period, and require an extremely high alignment precision among these layers.

SUMMARY OF THE INVENTION

The present invention is directed to a three-dimensional photonic crystal having a complete photonic band gap that is sufficiently maintained in a wide wavelength region, and a manufacturing method thereof.

A three-dimensional photonic crystal according to one aspect of the present invention includes a structure made of a first medium and a second medium having a refractive index lower than that of the first medium, which are periodically arranged in a three-dimensional direction. The structure has a first layer, a second layer, a third layer, and a fourth layer arranged in this order. A column structure in each of the first and third layers extends in a first direction. A column structure in each of the second and fourth layers extends in a second direction. The structure of each layer includes a flat surface as an end surface in a stacking direction of the first layer to the fourth layer, and a first structural portion, a second structural portion, and a third structural portion that are periodically arranged in an extending direction of the structure. The first structural portion has a first width along the flat surface and a first height the flat surface. The second structural portion has a second width larger than the first width and a second height larger than the first height. The third structural portion has a width and a height that continuously or stepwise change in the extending direction of the structure. The flat surface at the structural portion of one of two adjacent layers in the first layer to the fourth layer contacts a surface opposite to the flat surface at the second structural portion of the other of the two adjacent layers.

A method according to another aspect of the present invention for manufacturing a three-dimensional photonic crystal that includes a structure made of a first medium and a second medium having a refractive index lower than that of the first medium, which are periodically arranged in a three-dimensional direction, wherein the structure of each layer includes a flat surface as one end surface in a stacking direction of a plurality of layers, and first, second, and third structural portions that are periodically arranged in an extending direction of the structure, the first structural portion having a first width along the flat surface and a first height from the flat surface, the second structural portion having a second width larger than the first width and a second height larger than the first height, and the third structural portion having a width and a height that continuously or stepwise change in the extending direction of the structure includes a first step of forming a sacrifice layer having a groove, and a second step of depositing particles of the first medium in the groove, the second step utilizing an anisotropic or linear deposition method to form the third structural portion while inclining the sacrifice layer to a direction from which the particles of the first medium come in the linear deposition method.

Further features of the present invention will become apparent from the following description of exemplary embodiments with reference to the attached drawings.

DESCRIPTION OF THE EMBODIMENTS

Referring now the accompanying drawings, a description will be given of preferred embodiments of the present invention.

First Embodiment

Figure 1:
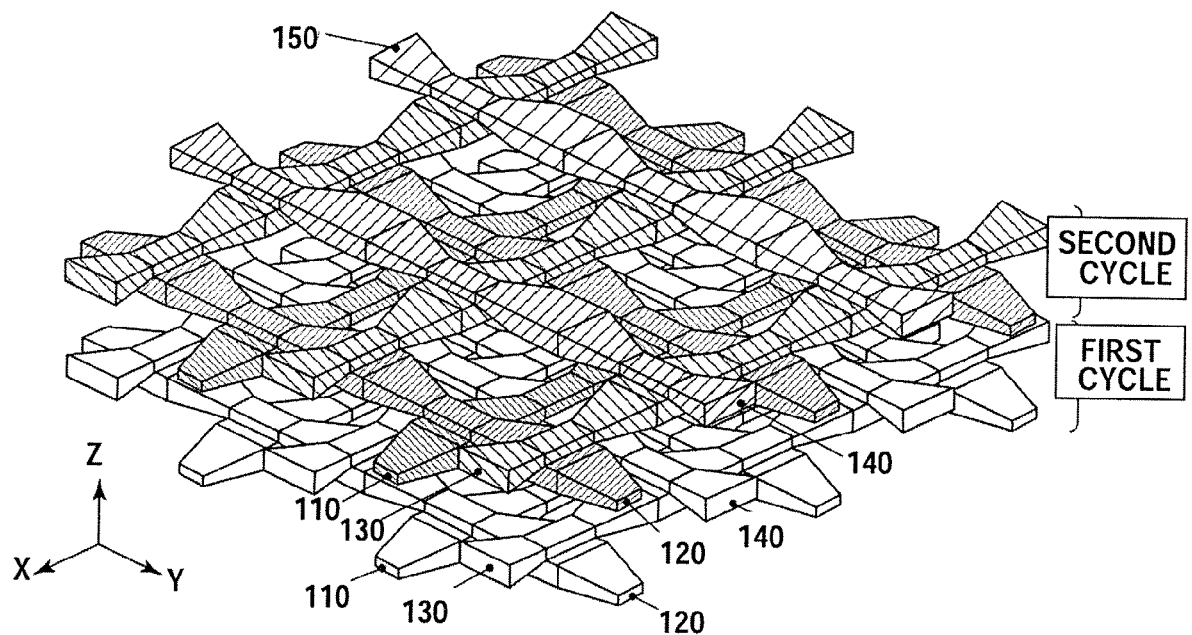
FIG. 1 is a perspective view showing a schematic structure of a three-dimensional photonic crystal according to a first embodiment of the present invention.

FIG. 1 schematically shows a three-dimensional photonic crystal according to a first embodiment of the present invention.

The three-dimensional photonic crystal according to this embodiment includes four stacked layers having a fundamental period of a first layer 110, a second layer 120, a third layer 130, and a fourth layer 140, and the fundamental period of four layers is repeated and forms a stack structure. FIG. 1 shows a structure corresponding to two fundamental periods.

Each of the first layer 110 to the fourth layer 140 includes a periodical and alternate arrangement of a plurality of columnar structures 150 made of a first medium, and a second medium (such as air) having a refractive index lower than that of the first medium. Thereby, the three-dimensional photonic crystal is formed in which the columnar structure 150 made of the first medium and the second medium are periodically arranged in a three-dimensional direction.

In addition, the columnar structure 150 in each of the first layer 110 and the third layer 130 extends in the X-axis direction (first direction), and the columnar structure 150 in each of the second layer 120 and the fourth layer 140 extends in the Y-axis direction (second direction).

The following description also refers to an extending direction of the columnar structure 150 as a longitudinal direction of the columnar structure 150. In addition, a width of the columnar structure 150 is defined as a size of the columnar structure 150 in a direction orthogonal to the longitudinal direction of the columnar structure 150 and in an arrangement direction of the columnar structures 150 in each layer (for example, the orthogonal direction is the Y-axis direction in the first layer 110 and the X-axis direction in the second layer 120). A height of the columnar structure 150 is defined as a size of the columnar structure 150 in the stacking direction (Z-axis direction) of the first layer 110 to the fourth layer 140 orthogonal to the longitudinal direction of the columnar structure 150.

The columnar structure 150 of the first layer 110 and the columnar structure 150 of the third layer 130 are arranged in the Y-axis direction, as will be described later in detail, while shifted by half an arrangement period of the columnar structure 150 (half period). Similarly, the columnar structure 150 of the second layer 120 and the columnar structure 150 of the fourth layer 140 are arranged in the X-axis direction, while shifted by half an arrangement period of the columnar structure 150 (half period).

Figure 2:
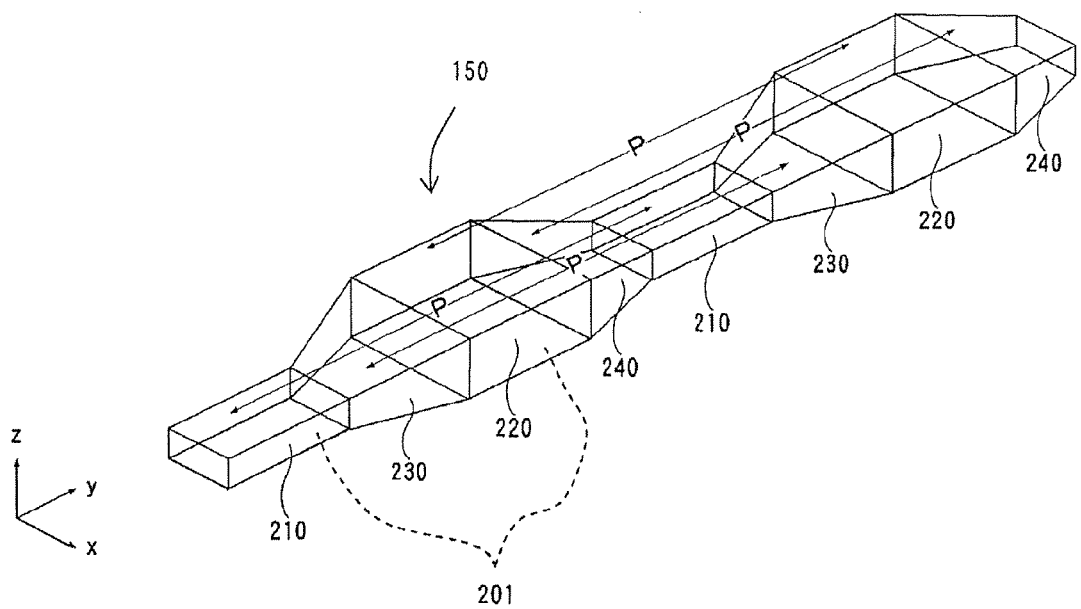
FIG. 2 is a perspective view of a columnar structure of the three-dimensional photonic crystal of the first embodiment.
Figure 3:
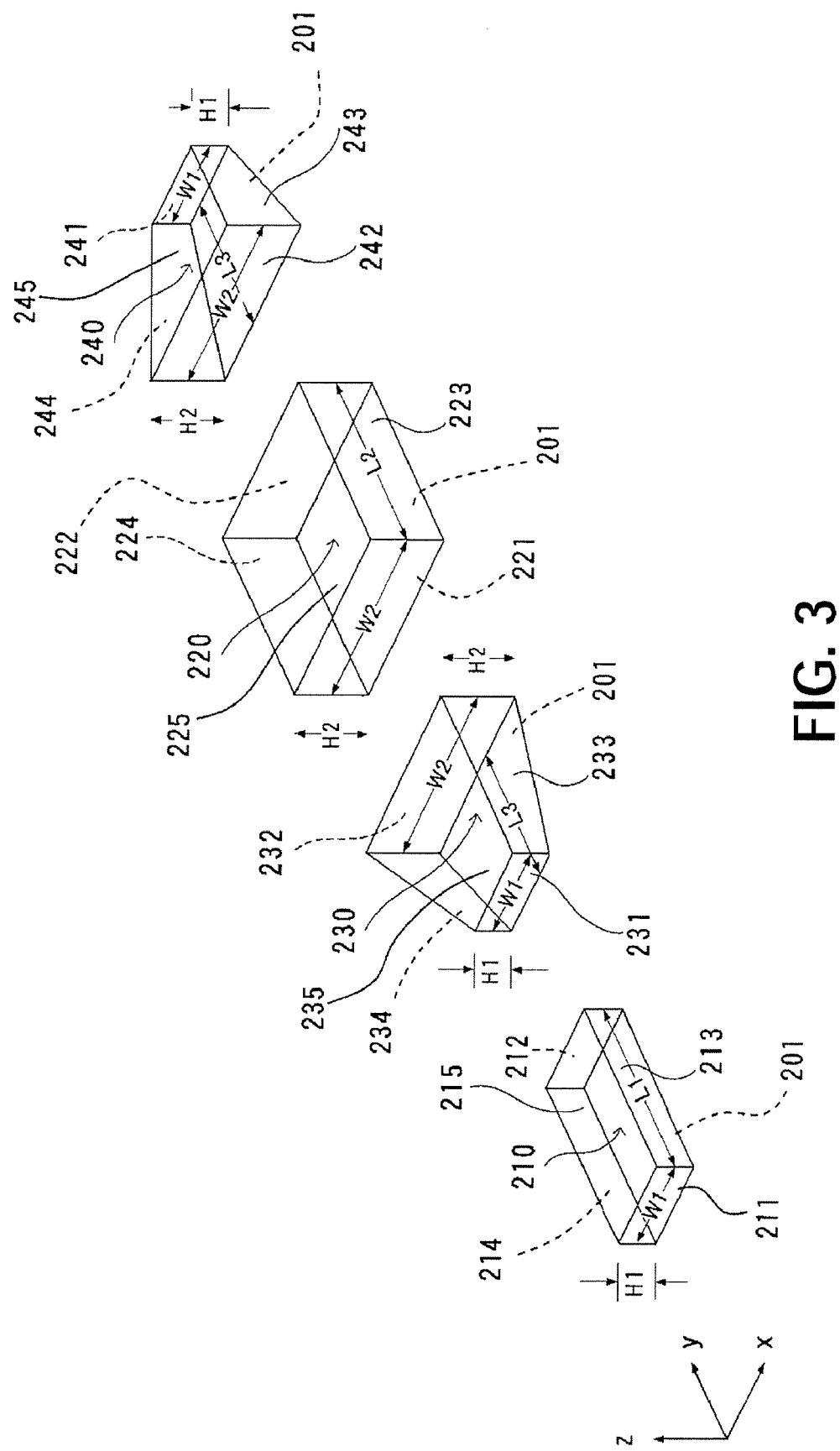
FIG. 3 is an exploded perspective view of the columnar structure shown in FIG. 2.

FIG. 2 shows a shape of the columnar structure 150. FIG. 3 shows an exploded state of a plurality of structural portions of the columnar structure 150, where x, y and z axes are a local coordinate system of the columnar structure 150 differently from the XYZ-axes coordinate. The x and y axes correspond to the X and Y axes in FIG. 1, and the z axis corresponds t the Z axis.

As shown in FIG. 2, the columnar structure 150 has a flat surface 201 that forms one end surface (bottom surface) in the stacking direction (z-axis direction) of the first layer 110 to the fourth layer 140. The flat surface 201 is a common bottom surface to first to third structural portions, which will be described later. The flat surface 201 may have a surface roughness (convexes and concaves) in a permissible range in an actual manufacture of the columnar structure 150.

210 denotes a first structural portion, which has a first width W1 that is a width along the flat surface 201 (which will be simply referred to as a "width" hereinafter), a first height H1 that is a height from the flat surface (which will be simply referred to as a "height" hereinafter), and a first length L1 that is a length in the longitudinal length (which will be simply referred to as a "length" hereinafter).

220 denotes a second structural portion, which has a second width W2 that is larger than the first width W1, and a second height H2 that is larger than the first height H1. The second structural portion 220 has a second length L2 that may be equal to or different from (shorter or longer than) the first length L1.

230 denotes a third structural portion, which is provided between the first and second structural portions 210 and 220. The third structural portion 230 has a shape having a continuously variable (increasing or decreasing) width and a continuously variable (increasing or decreasing) height in the longitudinal direction. An end of the third structural portion 230 which contacts the first structural portion 210 has the first width W1 and the first height H1, and an end of the third structural portion 230 which contacts the second structural portion 220 has the second width W2 and the second height H2. The third structural portion 230 has a third length L3, which may be equal to or different from (longer or shorter than) L1 or L2.

240 denotes a third structural portion, which is provided on a side opposite to the third structural portion 230 with respect to the second structural portion 220, and the third structural portion 240 has a shape (which is a surface symmetrical shape with respect to the xz surface) inverted in the longitudinal direction of the third structural portion 230. In other words, an end of the third structural portion 240 which contacts the first structural portion 210 has the first width W1 and the first height H1, and an end of the third structural portion 240 which contacts the second structural portion 220 has the second width W2 and the second height H2. Its length is the length L3.

In this embodiment, as shown in FIG. 3, side surfaces 213, 214, 223, and 224 of the first and second structural portions 210 and 220 in the width direction are parallel to the y-axis and z-axis directions (yz plane), and top surfaces 215 and 225 in the height direction and the bottom surface (flat surface 201) are parallel to the x-axis and y-axis directions (xy plane). In addition, both side surfaces 211, 212, 221, and 222 in the y-axis direction as the longitudinal direction are parallel to the x-axis and z-axis directions (xz plane). In other words, the first and second structural portions 210 and 220 each have a rectangular parallelepiped shape.

On the other hand, both end surfaces 231, 232, 241, and 242 of the third structural portions 230 and 240 in the longitudinal direction are parallel to the x-axis and z-axis directions (xz plane), and the bottom surface (flat surface 201) is parallel to the x-axis and y-axis directions (xy plane). In addition, side surfaces 233, 234, 243, and 244 in the width direction and top surfaces 235 and 245 have trapezoid shapes. In other words, the third structural portions 230 and 240 have truncated pyramid shapes.

The columnar structure 150 is formed by repetitively and periodically arranging the first structural portion 210, the second structural portion 220, and the third structural portions 230 and 240 in the y-axis direction as the longitudinal direction at a period of P=L1+L2+L3.

Figure 4:
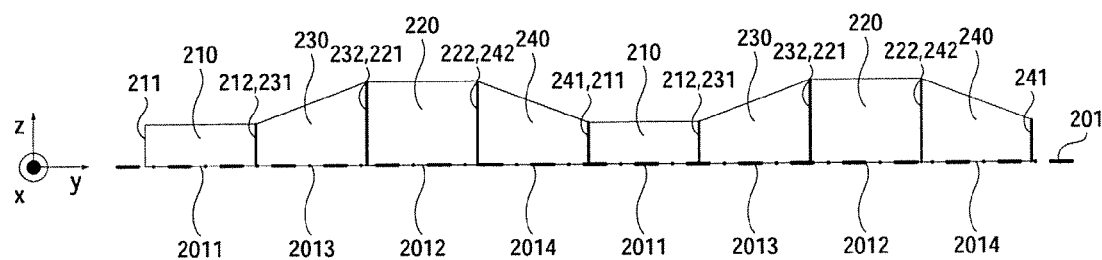
FIG. 4 is a side view of the columnar structure shown in FIG. 2.

FIG. 4 shows the columnar structures 150 viewed from the x-axis direction. The columnar structure 150 arranges the first structural portion 210, the third structural portion 230, the second structural portion 220, and the third structural portion 240 in this order in the y-axis direction. The y-axis direction end surfaces (212 and 231, 232 and 221, 222 and 242, 241 and 211) of the adjacent structural portions contact each other. Bottom surfaces 2011, 2012, 2013, and 2014 of the first to third structural portions 210 to 240 are the same surface as the flat surface 201.

Figure 5:
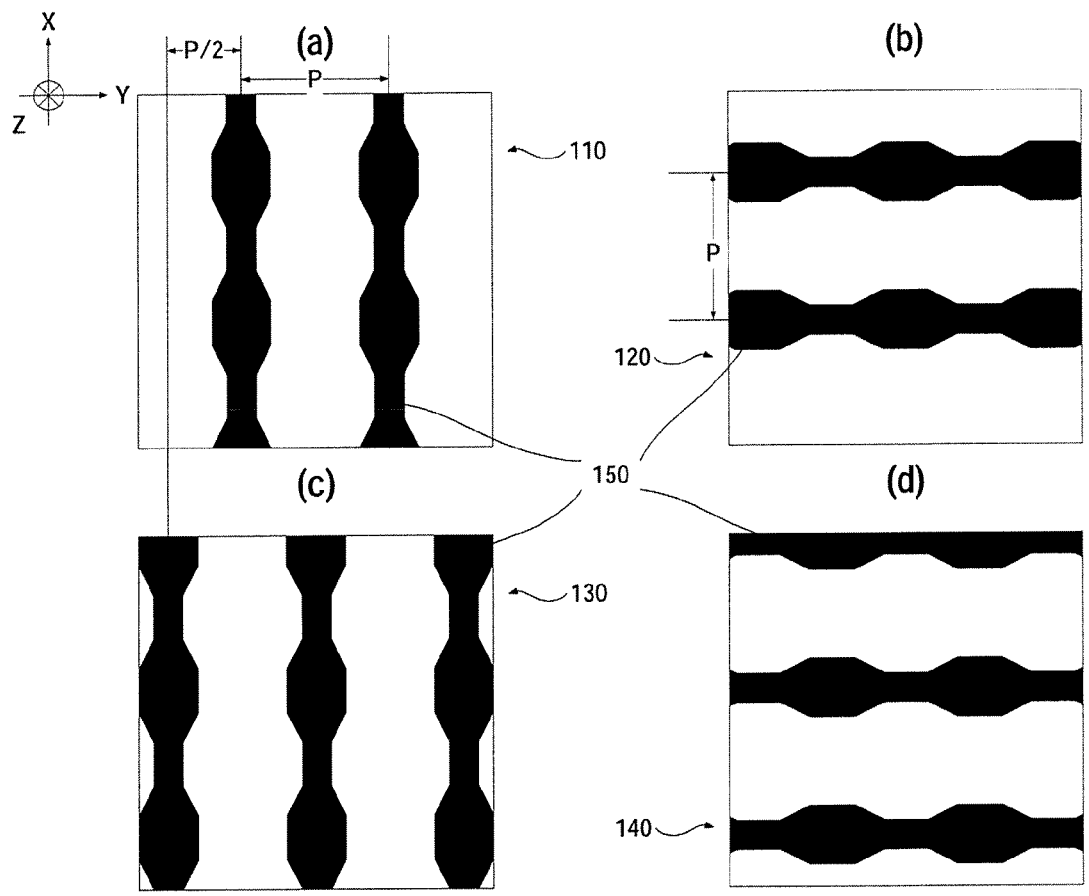
FIG. 5 is a plane view showing a structure of each layer of the three-dimensional photonic crystal of the first embodiment.

FIG. 5 shows the first to fourth layers 110 to 140 that are viewed from the Z-axis direction as the stacking direction. In the first layer 110 and the third layer 130, a plurality of columnar structures 150 extend in the X-axis direction and are arranged in the Y-axis direction at a constant period (at regular intervals) P. The columnar structure 150 of the first layer 110 and the columnar structure 150 of the third layer 130 are arranged in the Y-axis direction at shift positions by P/2.

In the second layer 120 and the fourth layer 140, a plurality of columnar structures 150 extend in the Y-axis direction and are arranged in the X-axis direction at a constant period (the regular intervals) P. The columnar structure 150 of the second layer 120 and the columnar structure 150 of the fourth layer 140 are arranged in the X-axis direction at shift positions by P/2.

Figure 6:
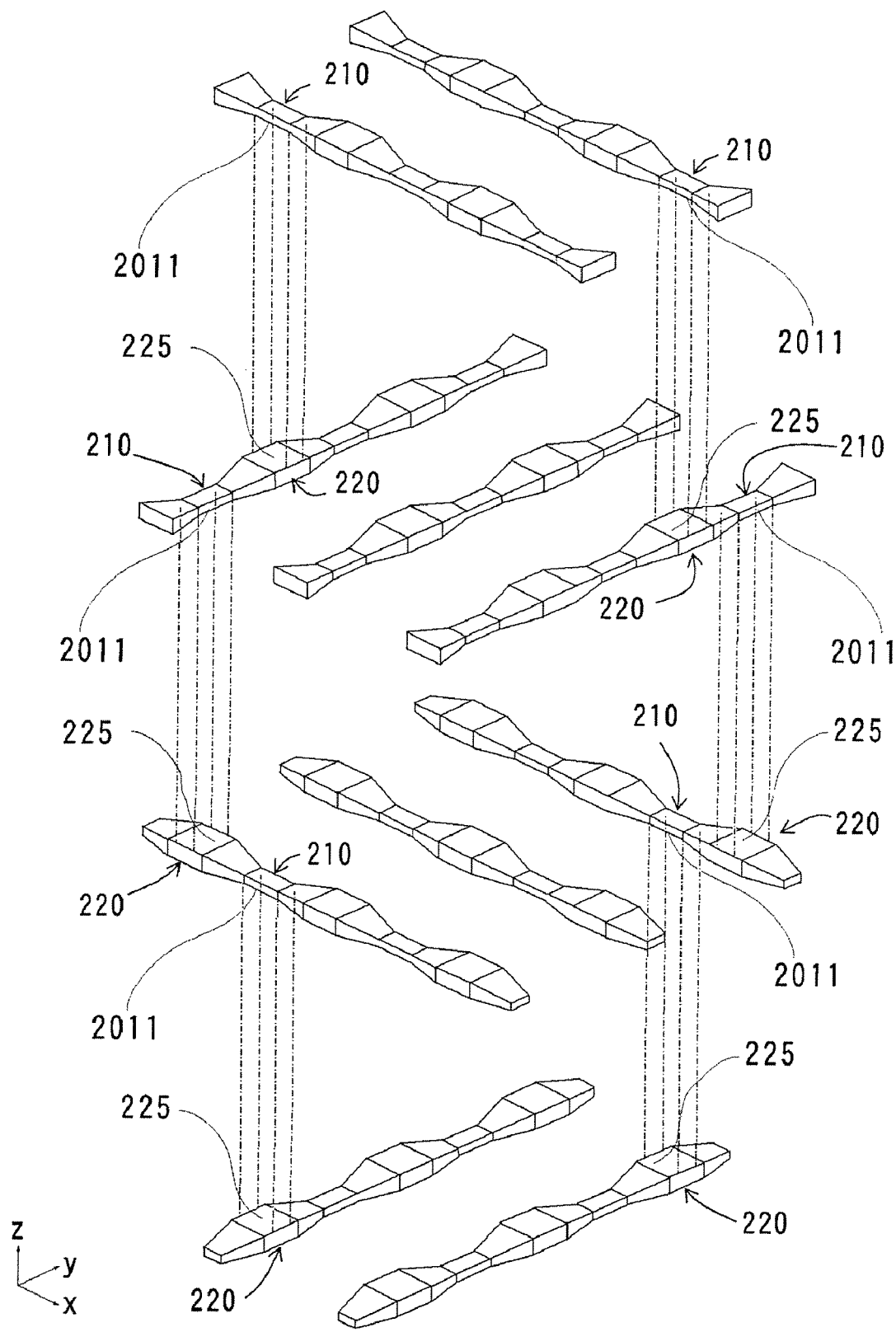
FIG. 6 is an exploded perspective view showing a joint state of the columnar structure of each player in the three-dimensional photonic crystal of the first embodiment.

FIG. 6 shows joining positions of the columnar structures 150 between two adjacent layers (i.e., the first layer and the second layer, the second layer and the third layer, and the third layer and the fourth layer) among the first layer to the fourth layer 110 to 140. Although not illustrated, this is true of the joining positions between the fourth layer 140 and the columnar structure 150 of the first layer 110 within another fundamental period.

A bottom surface 2011 of the first structure 210 that has the small width and small height in the columnar structure 150 of one of the two adjacent layers, crosses and contacts a top surface 225 of the second structural portion 220 that has the large width and large height in the columnar structure 150 of the other layer. The top surface 225 of the second structural portion 220 is a surface opposite to the bottom surface 2012 (flat surface 201).

The complete photonic band gap can be obtained in a wide frequency band (wavelength region) by properly setting refractive indexes of the first medium and the second medium and a shape of the columnar structure 150 in the thus-structured three-dimensional photonic crystal of this embodiment.

Figure 7:
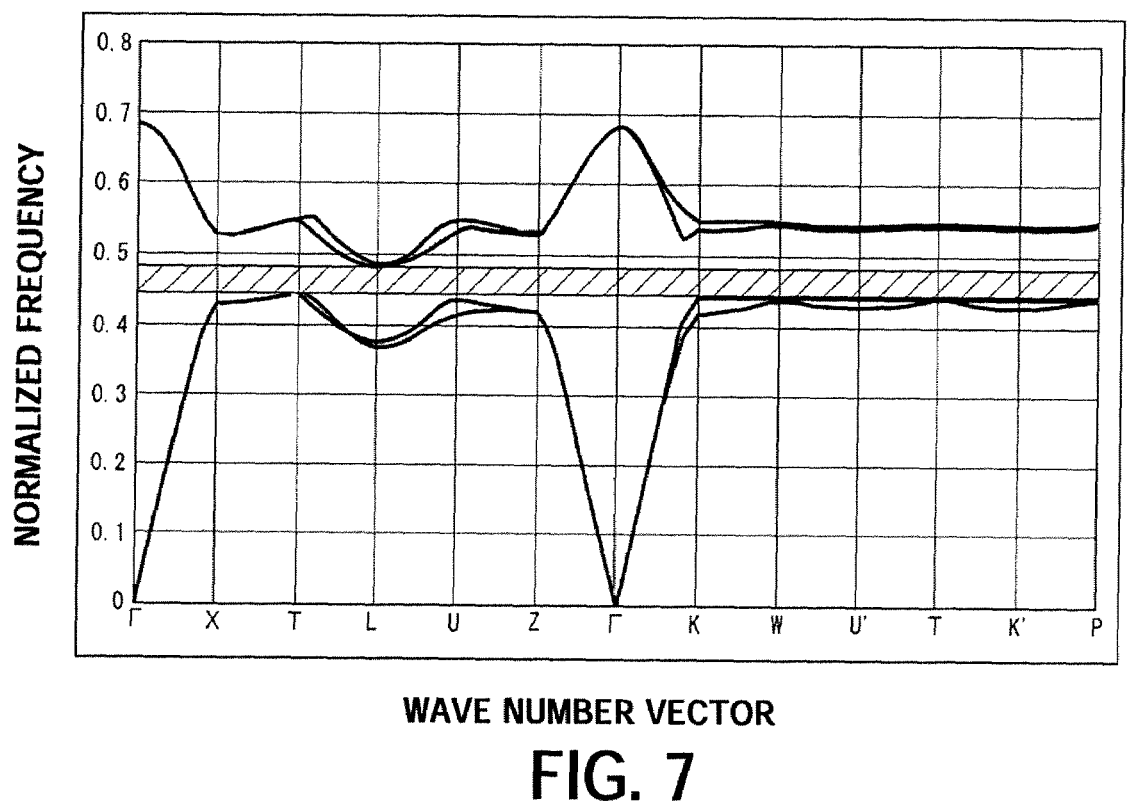
FIG. 7 is a view showing a characteristic of the three-dimensional photonic crystal according to the first embodiment.

For example, FIG. 7 shows a analytical result of the photonic band structure through a plane wave expansion method where refractive indexes N1 and N2 of the first medium and the second medium, the widths W1 and W2, the heights H1 and H2, and the lengths L1 and L2 of the first structural portion 210 and the second structural portion 220 are set to values shown in Table 1. Incidentally, W1, W2, H1, H2, L1, and L2 in Table 1 indicate ratios to the period P.

For example, assume that the period P is 250 nm, W1 is 85 nm, W2 is 92.5 nm, L1 is 25 nm, L2 is 105 nm, H1 is 45 nm, and H2 is 88.4 nm.

In FIG. 7, the abscissa axis denotes a wave number vector or an incident direction of the electromagnetic wave upon the photonic crystal.

For example, a point K indicates a wave number vector parallel to the Z axis, and a point X indicates a wave number vector having a gradient of 45° relative to the X axis (or Y axis) on the XY plane. A point L indicates a wave number vector having a gradient of 35.26° relative to the Y axis on the YZ plane. On the other hand, the ordinate axis denotes a (normalized) frequency that has been normalized with the period P.

A complete photonic bad gap that excludes the light irrespective of the light incident direction is formed between the normalized frequencies 0.44 and 0.48 hatched in FIG. 7.

A complete photonic band gap ratio $\Delta\omega/\omega 0$ in this structure is 0.085. The complete photonic band gap ratio $\Delta\omega/\omega 0$ is defined as a ratio of the (normalized) frequency band $\Delta\omega$ of the complete photonic band gap to the central (normalized) frequency $\omega 0$ of the complete photonic band gap.

For example, when the period P is 250 nm as described above, the complete photonic band gap's central wavelength is 541 nm, and the complete photonic band gap is obtained in a wavelength region between the wavelength of 519 nm and the wavelength of 565 nm.

The complete photonic band gap ratio of the three-dimensional photonic crystal of this embodiment is about 1.2 times as large as the three-dimensional photonic crystal of the conventional woodpile structure that utilizes the first and second media having the same refractive indexes of 2.4 and 1.0. The reasons will be set forth as follows:

A thickness at a position corresponding to a node of the columnar structure 150 is thicker than that of the woodpile structure. Therefore, a standing wave in which the energy concentrates on the first medium and a standing wave in which the energy concentrates on the second medium are likely to exist in the electromagnetic wave of a polarization component that has a vibration oscillation direction of an electric field in the stacking direction In addition, the complete photonic band gap has a wide band, because each energy concentration degree is high.

This embodiment describes that the first and second structural portions 210 and 220 each have a rectangular parallelepiped shape that is one type of a rectangular pole shape, and the third structural portions 230 and 240 each have a truncated pyramid shape. However, each structural portion may have another shape.

Figure 8A:
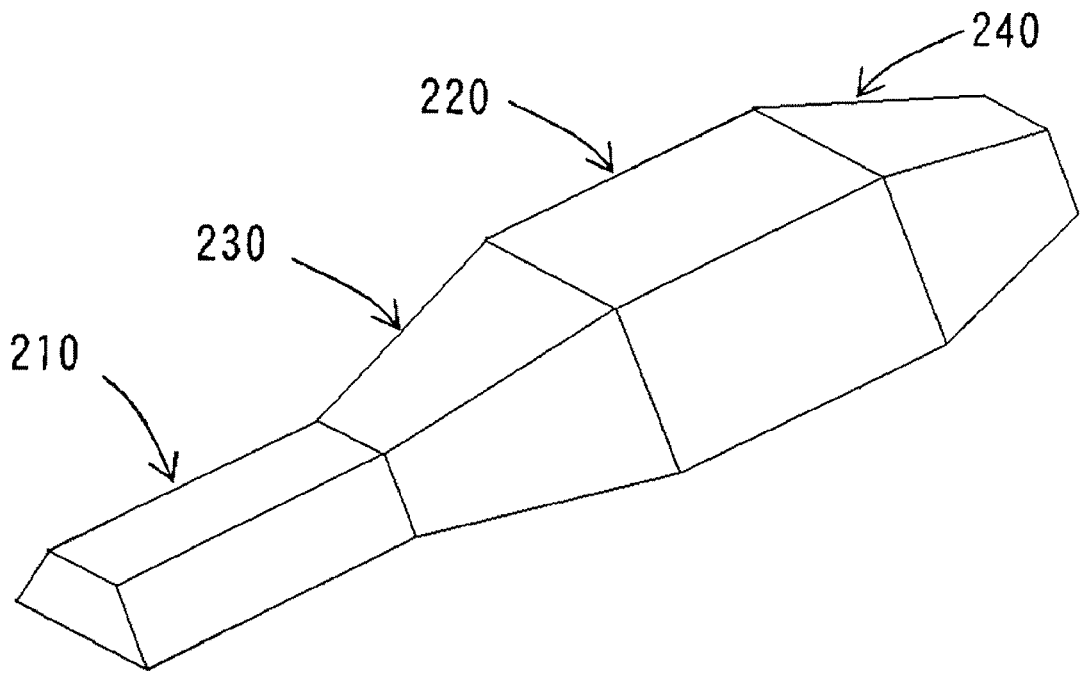
FIG. 8A is a perspective view showing a variation of the columnar structure shown in FIG. 2.

For example, as shown in FIG. 8A, the first to third structural portions 210 to 240 may each have a trapezoid shape in a section along the longitudinal direction. The first and second structural portions 210 and 220 in this case each have a rectangular pole shape that is not a rectangular parallelepiped shape, and the third structural portions 230 and 240 each have a truncated pyramid shape that has a trapezoid on the end surface in the longitudinal direction.

Figure 8B:
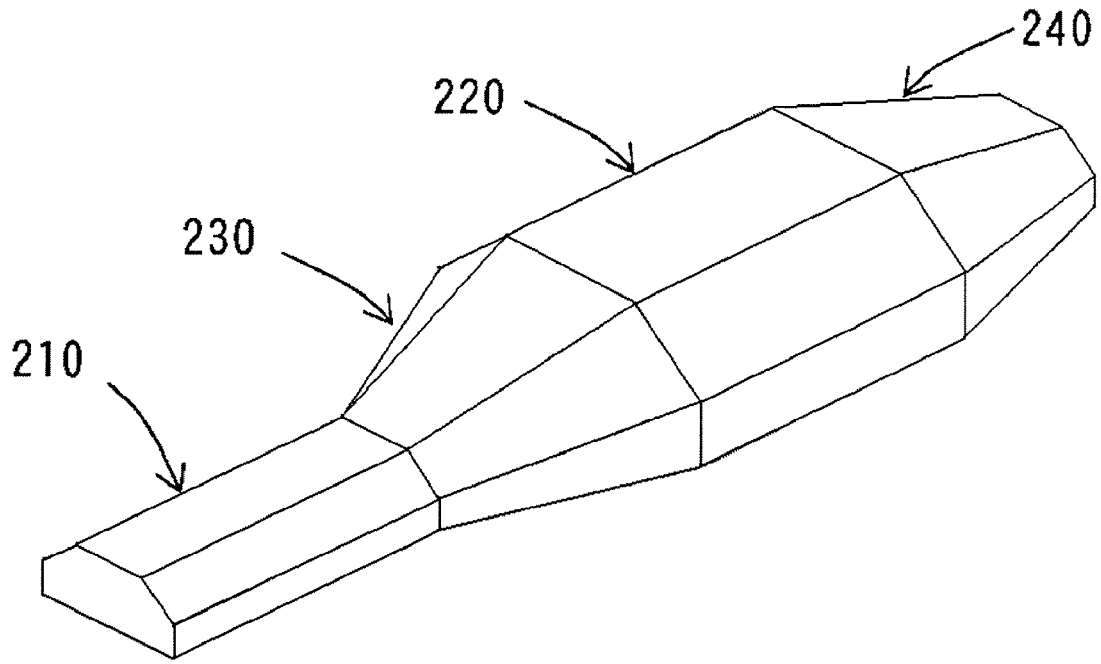
FIG. 8B is a perspective view showing another variation of the columnar structure shown in FIG. 2.

In addition, as shown in FIG. 8B, the first and second structural portions 210 and 220 may each have a hexagonal shape, and the third structural portions 230 and 240 may each have a truncated hexagonal prismoid.

Figure 8C:
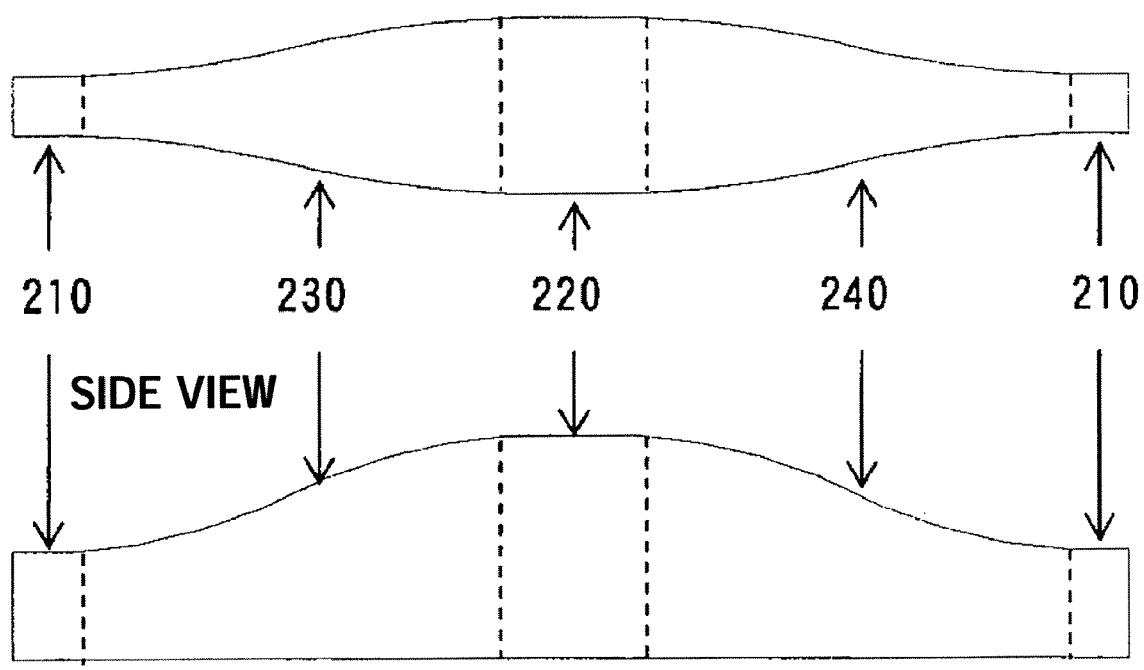
FIG. 8C is a plane view and a side view showing still another variation of the columnar structure shown in FIG. 2.

In addition, as shown in a plane view (top view) and a side view (bottom view) in FIG. 8C, a shape may have a smoothly variable (or curve-shaped) width and a smoothly variable (or curve-shaped) height. FIG. 8C shows boundaries among the first to third structural portions 210 to 240 in this case by dotted lines.

Figure 8D:
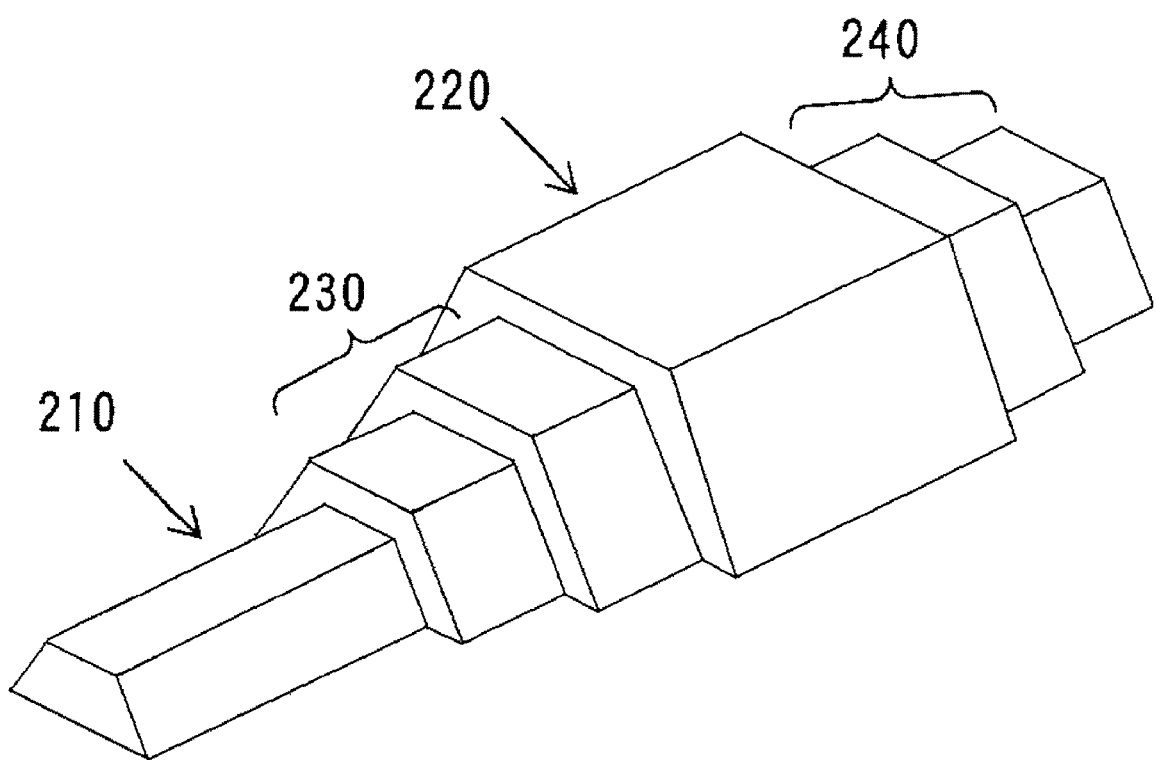
FIG. 8D is a perspective view showing another variation of the columnar structure shown in FIG. 2.

Moreover, as shown in FIG. 8D, the third structural portions 230 and 240 may each have a width and a height that change stepwise in the longitudinal direction.

In the three-dimensional photonic crystal of this embodiment, the refractive index and the size shown in Table 1 are merely illustrative and another refractive index and another size may be used. For example, Table 2 shows, as another example, the refractive indexes N1 and N2 of the first and second media, the widths W1 and W2, the heights H1 and H2, and the lengths L1 and L2 of the first and second structural portions 210 and 220. According to an analysis of the photonic band gap structure by the plane wave expansion method with each value set as in Table 2, the complete photonic band gap ratio becomes 0.215.

The complete photonic band gap ratio in this case is about 1.2 times as large as that of the woodpile structure that utilizes the first and second media of the same refractive indexes of 3.3 and 1.0.

Thus, the complete photonic band gap can be obtained in a wide frequency band (wavelength region) even with the different refractive indexes of the media of the three-dimensional photonic crystal.

In particular, this embodiment can make wider a frequency band that provides a complete photonic band gap, although the number of layers that constitutes one fundamental period is as small as four.

TABLE 1

| REFRACTIVE INDEX N1 OF FIRST MEDIUM | 2.4 |
| --- | --- |
| REFRACTIVE INDEX N2 OF SECOND MEDIUM | 1 |
| W1 | 0.34 |
| W2 | 0.37 |
| L1 | 0.1 |
| L2 | 0.42 |

TABLE 1-continued

| H1 | 0.18 |
| --- | --- |
| H2 | 0.3535 |

TABLE 2

| REFRACTIVE INDEX N1 OF FIRST MEDIUM | 3.3 |
| --- | --- |
| REFRACTIVE INDEX N2 OF SECOND MEDIUM | 1 |
| W1 | 0.31 |
| W2 | 0.33 |
| L1 | 0.09 |
| L2 | 0.27 |
| H1 | 0.13 |
| H2 | 0.3535 |

Second Embodiment

Next follows a description of an embodiment of a concrete manufacturing method of a three-dimensional photonic crystal (columnar structure 150) described in the first embodiment.

In the columnar structure 150 described in the first embodiment, the first and second structural portions 210 and 220 each have a constant width and a constant height, and thus the manufacture is extremely easy. On the other hand, since the third structural portions 230 and 240 each have a variable width and a variable height, this embodiment uses an "anisotropic deposition method."

The "anisotropic deposition method" will now be described. The anisotropic deposition method covers a CVD method and a sputtering method, and the sputtering method will now be described. In the sputtering, nonvolatile gas ions that have been accelerated by the DC voltage are irradiated onto a target. At this time, repelled neutral sputtering particles of the target collide with the gas particles and reach the substrate with angular dispersions. The "anisotropic deposition method" is a deposition method in which this angular dispersion is larger than that of the "linear deposition method," which will be described later.

Figure 9:
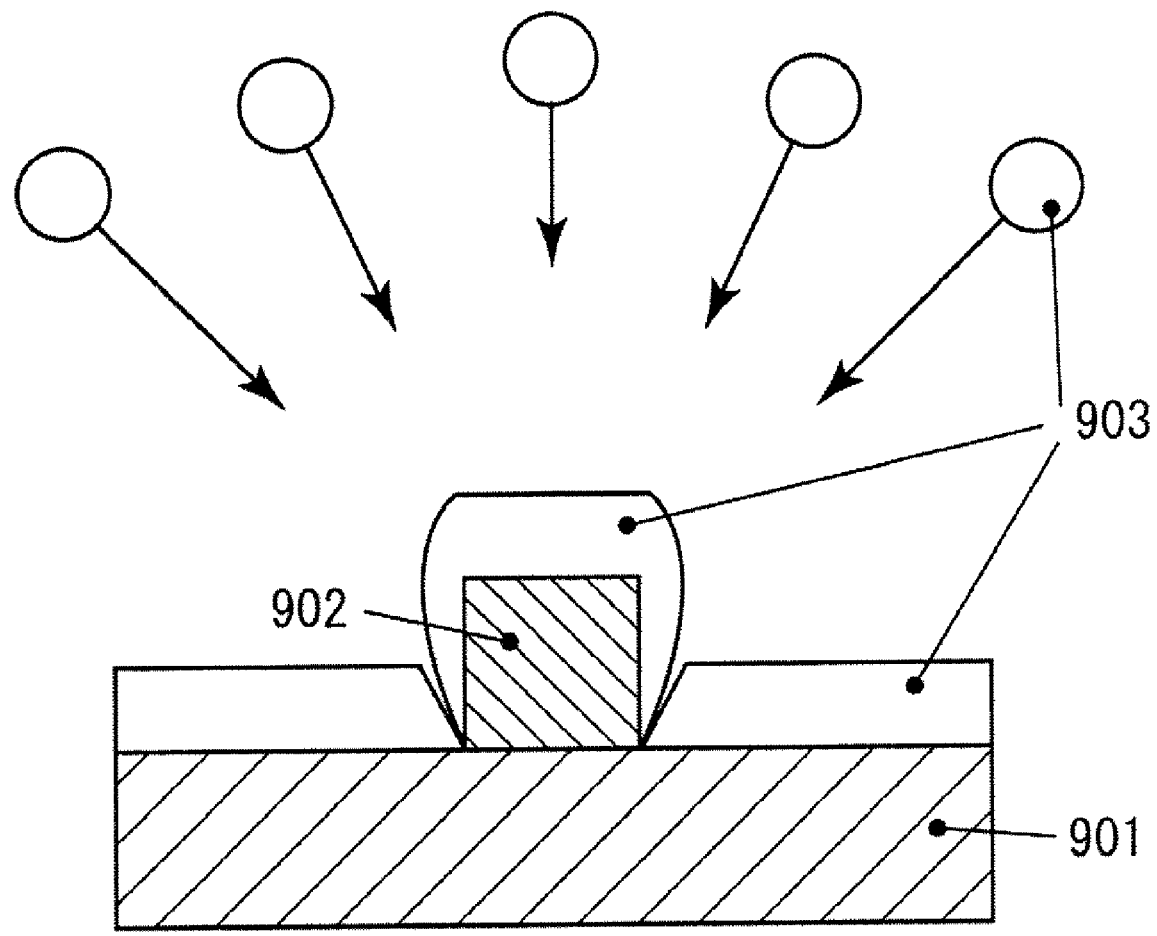
FIG. 9 is a view for explaining a principle of a manufacturing method of a three-dimensional photonic crystal according to a second embodiment of the present invention.

When the anisotropic deposition method is used and a convex area 902 is formed on a target substrate 901 through a sacrifice layer, as shown in FIG. 9, the convex area 902 blocks the sputtering particles 903 and reduces a deposition amount of sputtering particles 903 near the convex area 902.

Figure 10A:
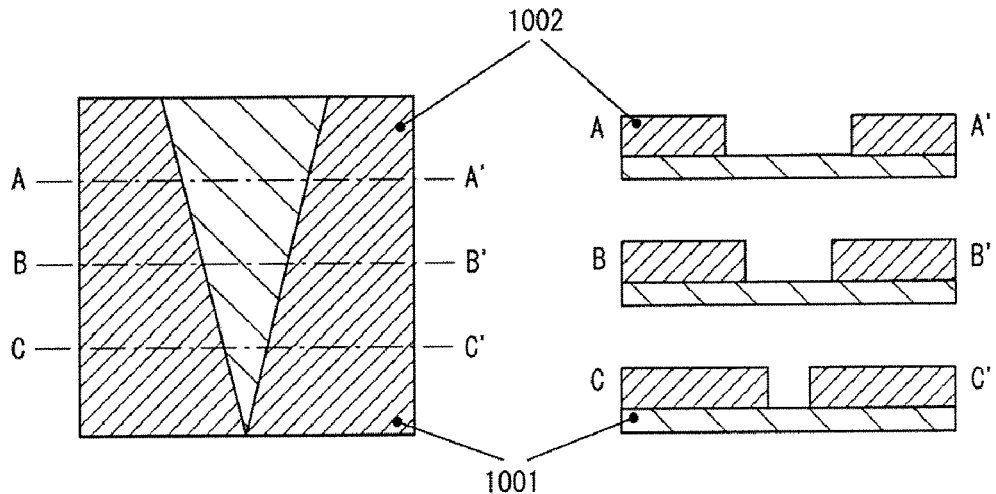
FIGS. 10A-10C are views each for explaining a manufacturing method of a third structural portion in the three-dimensional photonic crystal according to the second embodiment.
Figure 10B:
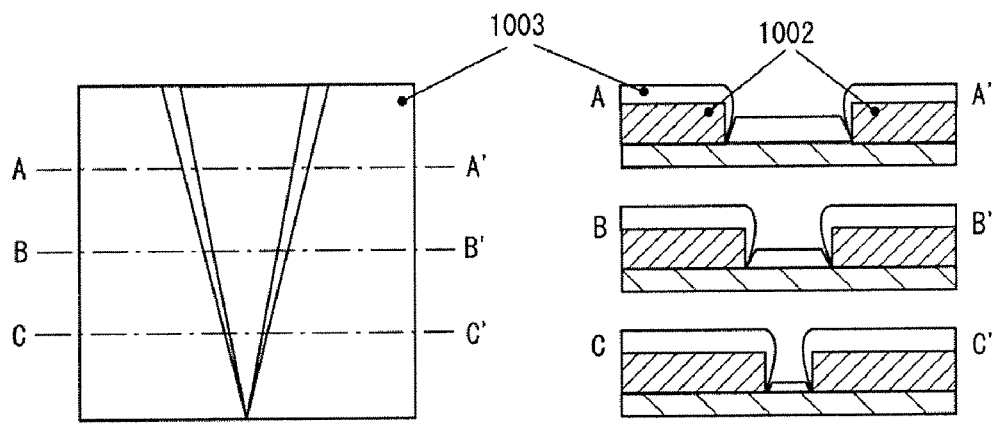
Figure 10C:
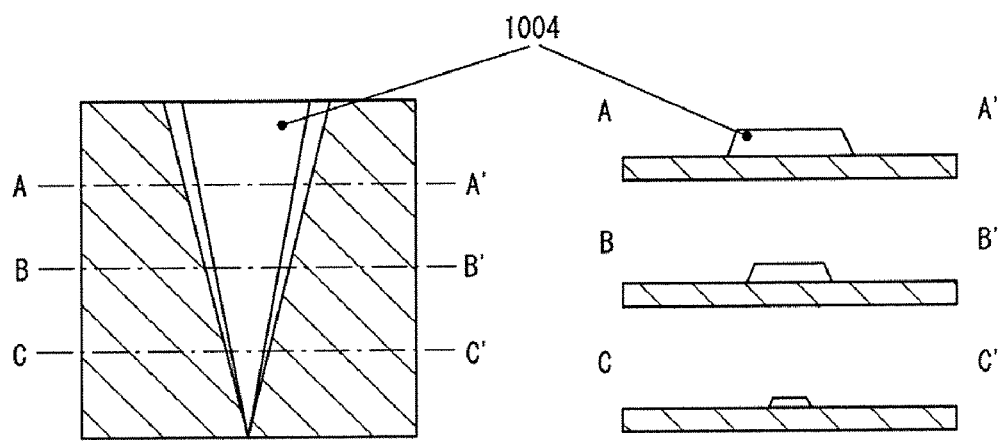

FIGS. 10A to 10C show a process of manufacturing a structure having the three-dimensionally continuously variable width and height shown in FIGS. 1 to 8C by utilizing this phenomenon. The structure in which the width and height continuously change three-dimensionally corresponds to the third structural portions 230 and 240 described for the first embodiment.

In FIGS. 10A to 10C, the left side is a plane view (corresponding to a view that is viewed from the Z-axis direction in FIG. 1), and the right side shows a section taken along lines A-A', B-B', and C-C' in the left side view.

Initially, as shown in FIG. 10A, a sacrifice layer 1002 in which a V-shaped groove having a continuously changing width in the plane view is provided on a substrate 1001 (first step). The structure shown in FIG. 8D having three-dimensionally stepwise changing width and height can be manufactured by stepwise changing the width of the groove in the sacrifice layer 1002.

Next, as shown in FIG. 10B, sputtering particles 1003 made of the first medium are deposited by the anisotropic deposition method on the substrate 1001 on which the sacrifice layer 1002 has been formed (second step). At this time, for the above reasons, an area having a smaller groove width has a smaller amount of the particles 1003 that deposit in the groove, and the width and the height becomes small.

Thereafter, as shown in FIG. 10C, when the sacrifice layer 1002 is removed, a structure 1004 is formed with the three-dimensionally continuously changing width and height.

Utilizing the method shown in FIGS. 10A to 10C, FIGS. 11A to 11F show a process for simultaneously manufacturing the structures having the first to third structural portions. FIGS. 11A to 11F show a plane view (corresponding to the view that is viewed from the Z-axis direction in FIG. 1), and two sections on the lines of two alternate long and short dash line in the plane view.

Figure 11A:
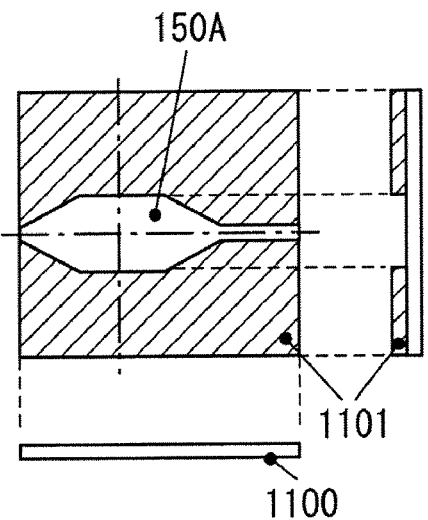
FIGS. 11A-11G are views each for explaining a manufacturing method of a columnar structure of the three-dimensional photonic crystal according to the second embodiment.

Initially, the sacrifice layer 1101 for the first layer that has a bottom surface pattern 150A of the columnar structure 150 as a groove is formed on the substrate 1100, as shown in FIG. 11A.

Next, the anisotropic deposition method is used to deposit the sputtering particles made of the first medium (solvent 1 in the figure) on the substrate 1100 in which the sacrifice layer 1101 has been formed. An area having a narrower groove width has a lower structure for the above reasons.

The first medium may be a medium that can generate anisotropic depositions, such as a compound semiconductor, such as GaAs, InP, GaN and ZnO, a semiconductor such as Si, and a dielectric material, such as $SiO_2$ and $TiO_2$. This embodiment uses $SiO_2$ for the first medium.

Figure 11B:
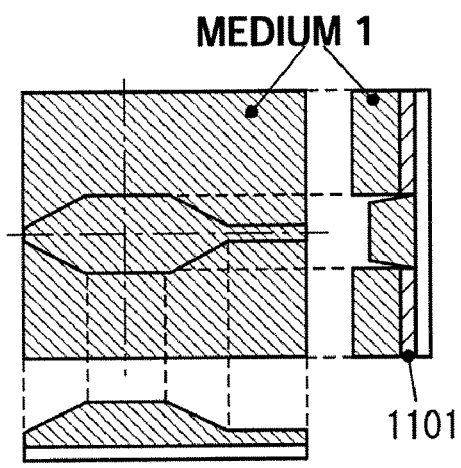
Figure 11C:
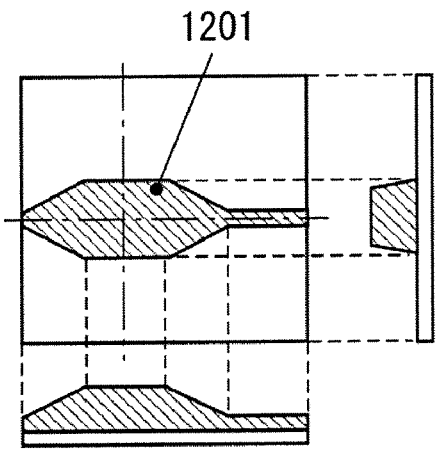

Next, the columnar structure 1201 that constitutes the first layer 110 shown in FIG. 1 is formed, as shown in FIG. 11C, through the liftoff of the sacrifice layer 1101 from the substrate 1100 by using the solvent 1 (not shown) that dissolves the sacrifice layer 1101 without dissolving the first medium ($SiO_2$).

Figure 11D:
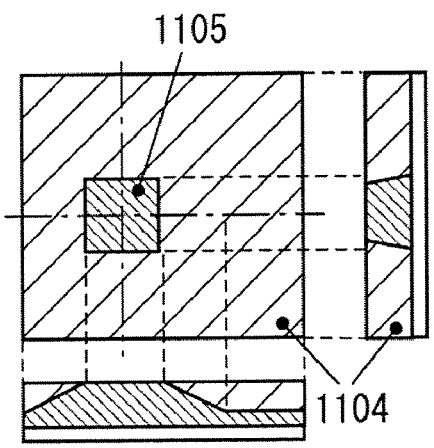

Next, the perimeter of the columnar structure 1201 is filled, as shown in FIG. 11D, by the vapor deposition with the sacrifice layer 1104 made of a material that does not dissolve in the solvent 1 but dissolves in another solvent 2. The solvent 2 is a solvent that does not dissolve $SiO_2$. For example, when the above sacrifice layer 1101 is made of an organic medium, such as resist, the sacrifice layer 1104 may be made of Cu by using an organic solvent, such acetone, for the solvent 1 and sulfuric acid for the solvent 2. A top surface of the columnar structure 1201 (which is the top surface 225 of the second structural portion 220 shown in FIG. 3) whose perimeter has been filled with the sacrifice layer 1104 is polished and made planar.

Figure 11E:
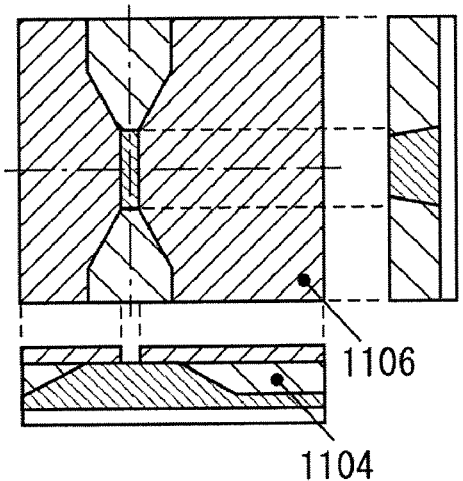

Subsequently, similar to the first layer, a sacrifice layer 1106 for the second layer which has a bottom surface pattern of the columnar structure 150 as a groove is formed, as shown in FIG. 11E. The groove extending direction is a direction orthogonal to the first layer.

Figure 11F:
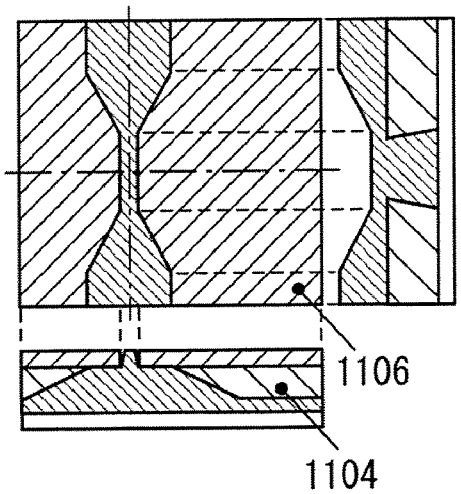
Figure 11G:
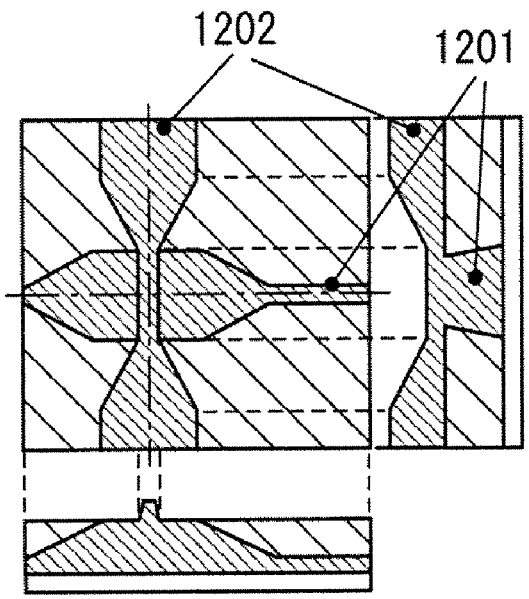

As shown in FIG. 11F, the anisotropic deposition method is used to deposit the sputtering particles made of the first medium on the substrate 1100 on which the sacrifice layer 1106 has been formed. An area having a narrower groove width results in a lower structure for the above reasons.

Next, the columnar structure 1202 that constitutes the first layer 120 shown in FIG. 1 is formed, as shown in FIG. 10G, through the liftoff of the sacrifice layer 1106 from the substrate 1100 by using the solvent 2. Since the sacrifice layer 1104 does not dissolve in the solvent 2, the columnar structure 1202 formed on the sacrifice layer 1104 is not lifted off neither.

The above process is repeated for the third and subsequent layers, and thereby manufacturing the columnar structure of the three-dimensional photonic crystal that has a fundamental period of the first to fourth layers.

Figure 12:
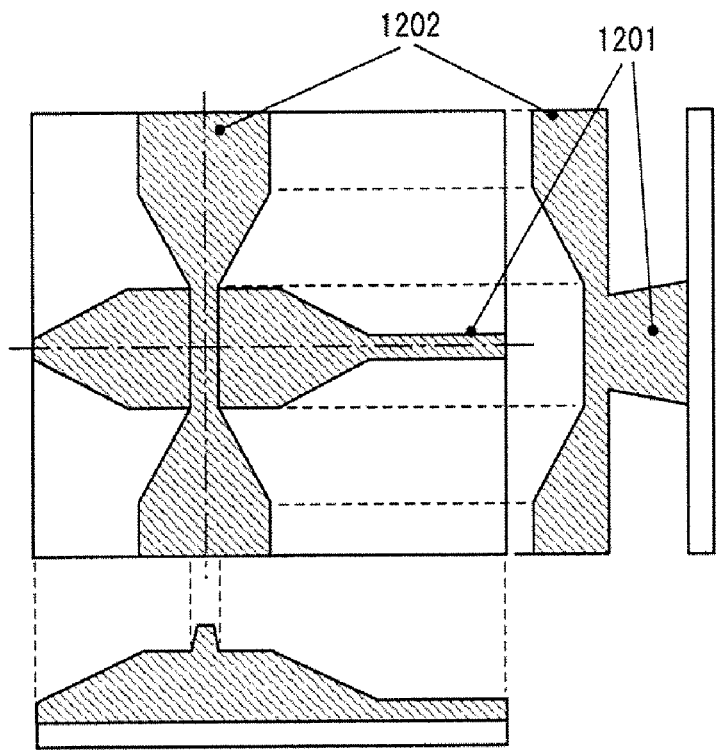
FIG. 12 is a view for explaining a manufacturing method of a columnar structure of the three-dimensional photonic crystal according to the second embodiment.

Finally, the remaining sacrifice layer 1104 is removed by using the solvent 2 so as to complete the three-dimensional photonic crystal that periodically arranges the air as the second medium and the columnar structure made of the first medium, as shown in FIG. 12.

This embodiment forms the columnar structure by once deposition of the first medium, but the third structural portion having the variable width and height and the first second structural portions having constant width and height may be separately formed. In addition, after the first medium is deposited, the width and height may be adjusted through etching of a predetermined area by using arranging a mask there.

The manufacturing method of this embodiment can produce the columnar structure having the variable width and height in each layer without increasing the number of steps of the woodpile structure. Therefore, the symmetry improves in an oblique direction including the stacking direction in addition to the interlayer direction, implementing a three-dimensional photonic crystal that provides a complete photonic band gap in a wider wavelength region.

Third Embodiment

Next follows a description of another example of a concrete manufacturing method of the three-dimensional photonic crystal (columnar structure 150) described in the first embodiment.

This embodiment describes a manufacturing process that utilizes a linear deposition method by inclining a substrate (or a prospective formation area of the columnar structure).

The "linear deposition method" will now be described. One linear deposition method is a vacuum vapor deposition method. In the vacuum vapor deposition method, target atoms are heated and evaporated by the electron beam, and deposit on the substrate. Since the evaporated target atoms proceed in the vacuum, an angular dispersion of the particle (atom) incoming upon the substrate is smaller than that of the anisotropic deposition method. This deposition method having the small angular dispersion is referred to as the "linear deposition method."

Figure 13A:
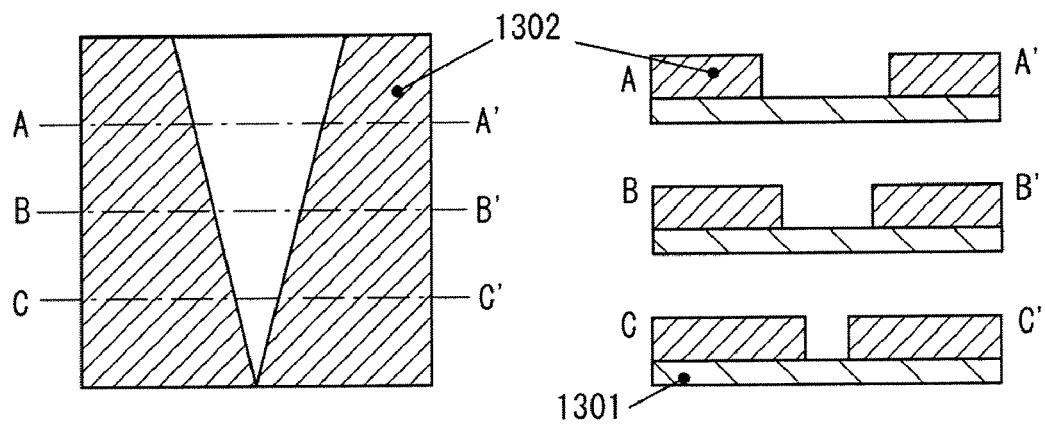
FIGS. 13A-13D are views each for explaining a manufacturing method of a third structural portion in the three-dimensional photonic crystal according to a third embodiment.
Figure 13B:
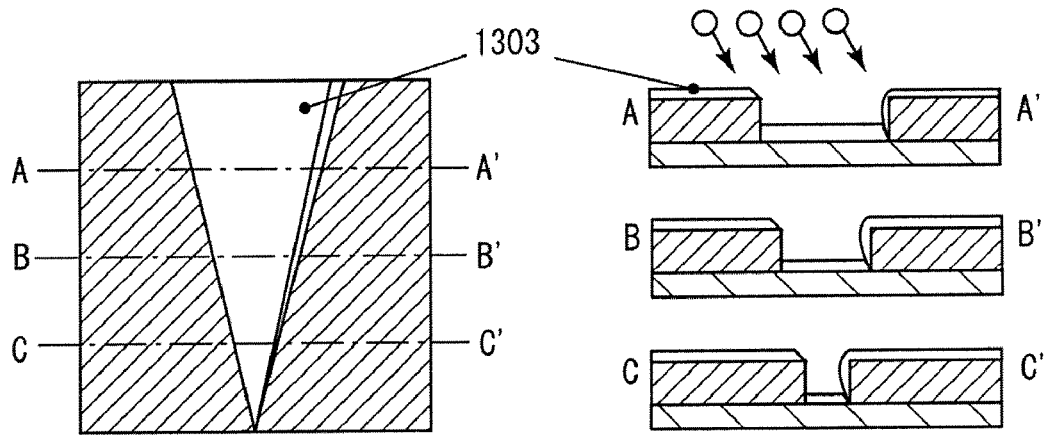
Figure 13C:
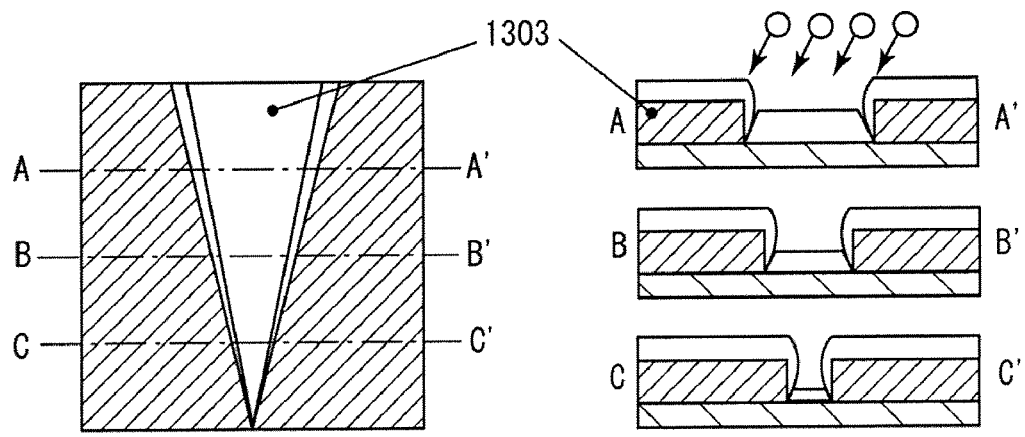

FIGS. 13A to 13C show a process of manufacturing a structure that has the three-dimensionally continuously changing width and height shown in FIGS. 1 to 8C by utilizing the linear deposition method.

In FIGS. 13A to 13C, the left side is a plane view (corresponding to a view that is viewed from the Z-axis direction of FIG. 1), and the right side shows a section taken along lines A-A', B-B' and C-C' in the left side view.

Initially, a sacrifice layer 1302 that possesses a V-shaped groove with a continuously changing width in the plane view is formed, as shown in FIG. 13A, on a substrate 1301 (first step). In the meanwhile, the structure shown in FIG. 8D in which the width and height three-dimensionally change stepwise can also be manufactured by stepwise changing the width of the groove in the sacrifice layer 1002.

Next, as shown in FIG. 13B, a linear deposition is performed by inclining the substrate 1301 by a predetermined angle to a (vapor deposition) direction from which the particle comes (second step). Moreover, as shown in FIG. 13C, the substrate 1301 is inclined by a predetermined angle in a direction opposite to that shown in FIG. 13B, and the linear deposition follows. When the linear deposition is performed with the inclined substrate 1301, the sacrifice layer 1302 blocks the flying (vapor deposition) particles 1302 of the first medium. Therefore, an area having a smaller groove width in the sacrifice layer 1302 results in a smaller amount of the particles 1302 that deposit in the groove, and the width and height become small.

Figure 13D:
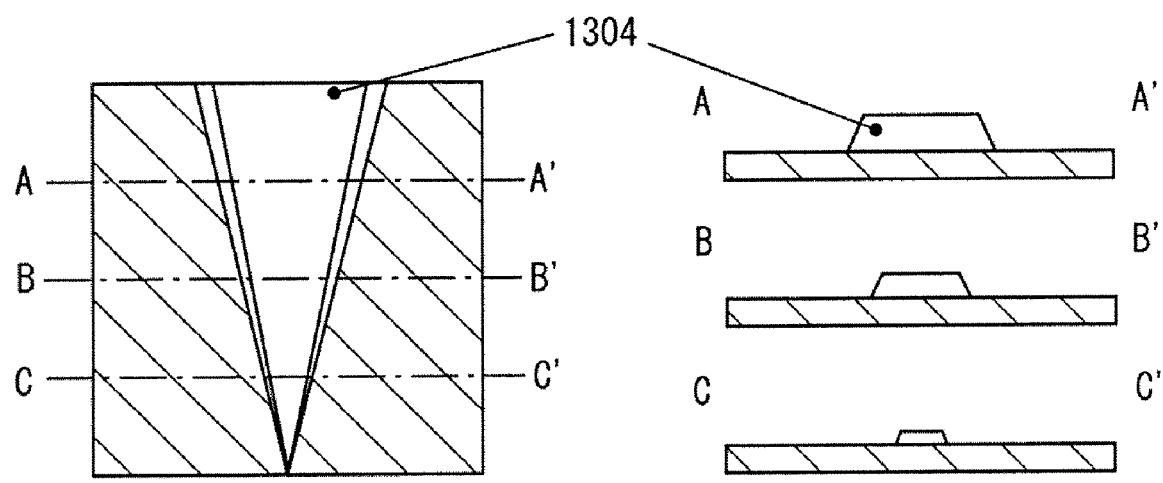

Thereafter, as shown in FIG. 13D, when the sacrifice layer 1302 is removed by using the solvent 502, the structure 1304 is formed with the three-dimensionally different width and height.

The first medium may be a medium that can generate a linear deposition through the vapor deposition, such as a compound semiconductor, such as GaAs, InP, GaN and ZnO, a semiconductor such as Si, and a dielectric material, such as SiO2 and TiO2.

The second and subsequent layers are formed by utilizing such a process as described with reference to FIG. 11A and FIG. 11B in the second embodiment.

The manufacturing method of this embodiment can form the columnar structure having the variable width and height in each layer by adding the substrate inclining step to the conventional woodpile structure. Therefore, the symmetry improves in an oblique direction including a stacking direction in addition to the interlayer direction, implementing a three-dimensional photonic crystal that provides a complete photonic band gap in a wider wavelength region.

Fourth Embodiment

Next follows a description of a functional device that utilizes the three-dimensional photonic crystal described in the first embodiment. Various functional devices can be implemented by utilizing the complete photonic band gap operation of the three-dimensional crystal.

Figure 14A:
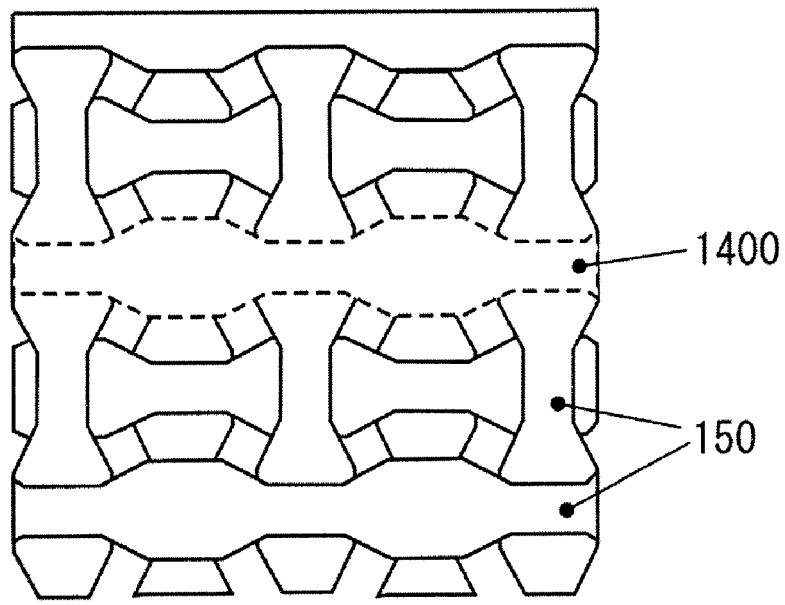
FIG. 14A is a view showing an example of a functional device according to a fourth embodiment of the present invention that utilizes the three-dimensional photonic crystal according to the first embodiment.

FIG. 14A shows the functional device having a waveguide 1400 by providing a line defect part that disturbs the period to the interior of the three-dimensional photonic crystal. The electromagnetic wave (such as light) within the photonic band gap wavelength region in the photonic crystal exists only in the waveguide 1400 formed by the linear defect part. Therefore, the functional device that propagates only the electromagnetic wave via the waveguide 1400 can be implemented.

Figure 14B:
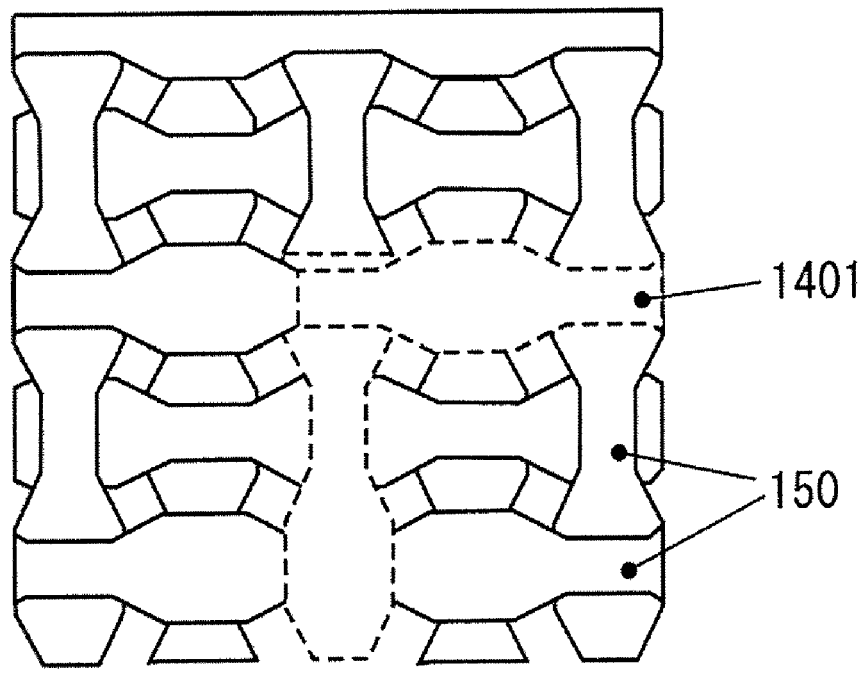
FIG. 14B is a view showing an example of another functional device according to the first embodiment that utilizes the three-dimensional photonic crystal.

FIG. 14B shows a functional device having a curved waveguide 1401 by providing a plurality of linear defect parts to the interior of the three-dimensional photonic crystal.

Figure 14C:
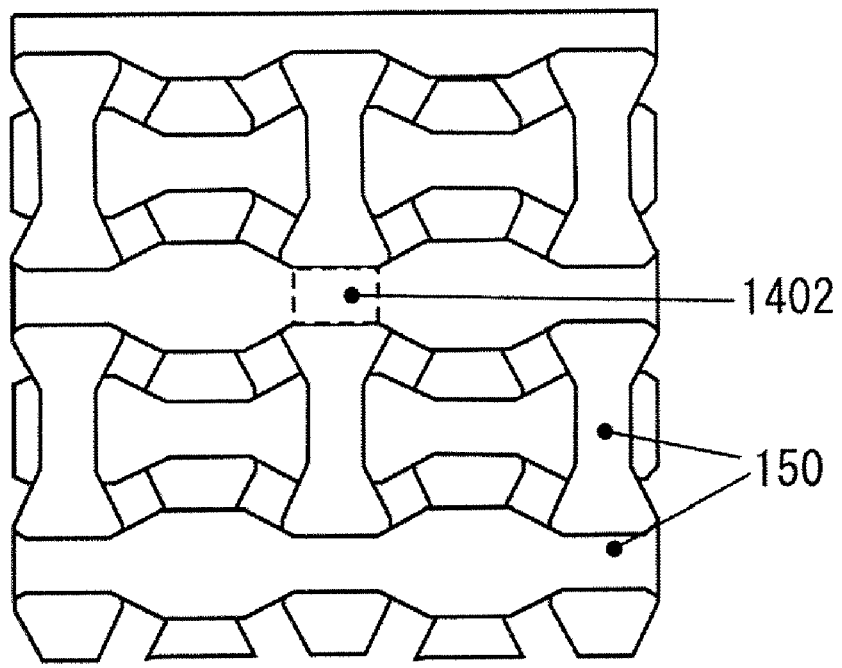
FIG. 14C is a view showing an example of another functional device according to the first embodiment that utilizes the three-dimensional photonic crystal.

FIG. 14C shows a functional device having a resonator 1402 by providing an isolated point defect part that disturbs the period, to the interior of the three-dimensional photonic crystal. The functional device that includes a high performance resonator having a high enclosure effect can be implemented by enclosing the electromagnetic wave within the photonic band gap wavelength region in the photonic crystal, in the very small resonator 1402 as a point defect part. In addition, use of this resonator can implement a wavelength selection filter that takes from an incident wave the electromagnetic wave having a very narrow wavelength region corresponding to the resonance wavelength of the resonator.

In addition, a light emitting element, such as a high efficiency laser and an LED, can be implemented by filling the resonator with an intrinsic material and by supplying the energy through the electromagnetic wave or the current from the outside of the resonator.

For example, an optical-communication light source is available by setting the resonance wavelength of the resonator to the infrared light communication wavelength band of 800 nm to 1800 nm. In addition, when the resonance wavelength of the resonator is set to red (R), green (G), and blue (B) as three primary colors of the light, it is used for a light source for an image display apparatus. Moreover, it can be used as an optical-pickup light source in an apparatus, such as a CD and a DVD.

In addition, a micro miniature enhanced integrated circuit can be implemented by combining a wide variety of functional devices, such as the waveguide shown in FIGS. 14A and 14B, the resonator and the light emitting element shown in FIG. 14C, and a polarization element that utilizes a dispersion abnormality in the photonic band.

While FIGS. 14A to 14C show an example that forms the waveguide (linear defect part) and the resonator (point defect part) by removing part of the columnar structure in the three-dimensional photonic crystal, the waveguide and the resonator may be formed by shifting the original position of the columnar structure, and by changing a shape of the columnar structure. In addition, a waveguide as a linear defect part and a resonator as a point defect part may be formed by replacing part of the columnar structure with a material that is different in refractive index from the first material.

As described above, this embodiment maintains the number of layers configured to constitute one fundamental period to be as small as four layers, and can manufacture the three-dimensional photonic crystal without greatly increasing the number of steps of the woodpile structure. The three-dimensional photonic crystal of this embodiment is weak in the directional dependency of the refractive index periodic structure, and thus provides a complete photonic band gap in a wider frequency region (wavelength region) than the woodpile structure.

When the functional device is implemented by using the this three-dimensional photonic crystal, a functional device or a micro miniature enhanced integrated circuit that can be easily manufactured and operate in a wider wavelength region The present invention can easily manufacture the three-dimensional photonic crystal having a complete photonic band gap that is sufficiently maintained in a wide wavelength region.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-318617, filed on Dec. 10, 2007, which is hereby incorporated by reference herein in its entirety.

What is claimed is:

1. A three-dimensional photonic crystal comprising a structure made of a first medium and a second medium having a refractive index lower than that of the first medium, which are periodically arranged in a three-dimensional direction,
wherein the structure has a first layer, a second layer, a third layer, and a fourth layer arranged in this order, the structure in each of the first and third layers extending in a first direction, and the structure in each of the second and fourth layers extending in a second direction,
wherein the structure of each layer includes a flat surface as one end surface in a stacking direction of the first layer to the fourth layer, and a first structural portion, a second structural portion, and a third structural portion that are periodically arranged in an extending direction of the structure, the first structural portion having a first width along the flat surface and a first height from the flat surface, the second structural portion having a second width larger than the first width and a second height larger than the first height, and the third structural portion having a width and a height that continuously or stepwise change in the extending direction of the structure, and wherein the flat surface of the first structural portion of one of two adjacent layers in the first layer to the fourth layer contacts a surface opposite to the flat surface of the second structural portion of the other of the two adjacent layers.

2. A functional device that operates by utilizing a photonic band gap operation of a three-dimensional photonic crystal according to claim 1.

3. A method for manufacturing a three-dimensional photonic crystal that includes a structure made of a first medium and a second medium having a refractive index lower than that of the first medium, which are periodically arranged in a three-dimensional direction, wherein the structure of each layer includes a flat surface as one end surface in a stacking direction of a plurality of layers each including a plurality of structures, and first, second, and third structural portions that are periodically arranged in an extending direction of the structure, the first structural portion having a first width along the flat surface and a first height from the flat surface, the second structural portion having a second width larger than the first width and a second height larger than the first height, and the third structural portion having a width and a height that continuously or stepwise change in the extending direction of the structure, said method comprising:

a first step of forming a sacrifice layer having a groove; and a second step of depositing particles of the first medium in the groove, the second step utilizing an anisotropic deposition method to form the third structural portion.

4. A method for manufacturing a three-dimensional photonic crystal that includes a structure made of a first medium and a second medium having a refractive index lower than that of the first medium, which are periodically arranged in a three-dimensional direction, wherein the structure of each layer includes a flat surface as one end surface in a stacking direction of a plurality of layers each including a plurality of structures, and first, second, and third structural portions that are periodically arranged in an extending direction of the structure, the first structural portion having a first width along the flat surface and a first height from the flat surface, the second structural portion having a second width larger than the first width and a second height larger than the first height, and the third structural portion having a width and a height that continuously or stepwise change in the extending direction of the structure, said method comprising:

a first step of forming a sacrifice layer having a groove; and a second step of depositing particles of the first medium in the groove, the second step utilizing a linear deposition method to form the third structural portion while inclining the sacrifice layer to a direction from which the particles of the first medium come in the linear deposition method.

* * * * *